US012048932B2

(12) United States Patent
Albrecht

(10) Patent No.: US 12,048,932 B2
(45) Date of Patent: Jul. 30, 2024

(54) SEPARATOR AND FEED SCREW FOR A GRINDING MACHINE

(71) Applicant: Provisur Technologies, Inc., Chicago, IL (US)

(72) Inventor: Christopher Albrecht, Cambridge, WI (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 155 days.

(21) Appl. No.: 17/652,978

(22) Filed: Mar. 1, 2022

(65) Prior Publication Data
US 2023/0278041 A1 Sep. 7, 2023

(51) Int. Cl.
*B02C 18/30* (2006.01)
*B02C 18/36* (2006.01)
*A22C 17/00* (2006.01)

(52) U.S. Cl.
CPC ......... *B02C 18/305* (2013.01); *B02C 18/302* (2013.01); *B02C 18/365* (2013.01); *A22C 17/0026* (2013.01); *B02C 2018/308* (2013.01)

(58) Field of Classification Search
CPC ....... B02C 18/30; B02C 18/301; B02C 18/36; B02C 18/362; B02C 18/365
See application file for complete search history.

(56) References Cited

U.S. PATENT DOCUMENTS

| | | |
|---|---|---|
| 1,435,796 A | 11/1922 | Bennett |
| 2,810,339 A | 10/1957 | Satzinger |
| 2,841,197 A * | 7/1958 | Ardrey ................. B02C 18/301 241/82.2 |
| 3,310,086 A | 3/1967 | Lasar |
| 3,323,570 A | 6/1967 | Tullock et al. |
| 3,376,910 A | 4/1968 | Popeil |
| 3,739,994 A | 6/1973 | McFarland |

(Continued)

FOREIGN PATENT DOCUMENTS

| | | | |
|---|---|---|---|
| CN | 107225032 A | * 10/2017 | ........... B02C 18/301 |
| JP | 2011174355 A | 9/2011 | |

(Continued)

OTHER PUBLICATIONS

International Search Report and Written Opinion for International Application PCT/US2022/70939 mailed dated Jul. 14, 2022, 24 pages.

*Primary Examiner* — Faye Francis
(74) *Attorney, Agent, or Firm* — Klintworth & Rozenblat IP LLP

(57) ABSTRACT

A grinding machine includes first feed screw, first head, first center pin, first knife assembly, bushing and first orifice plate. Second feed screw is coupled to first center pin and rotates within second head. Second feed screw is positioned against the bushing such that the bushing acts as a thrust bearing. Second center pin is coupled to second feed screw and is configured to rotate a second knife assembly. Second orifice plate is arranged on second center pin. Second mounting ring can be linearly adjusted relative to second head to axially position second orifice plate between a stop shoulder of second head and a lip of second mounting ring. Second feed screw may include a plurality of flights arranged in a split flight configuration including one or more ingress end flights and one or more egress end flights.

13 Claims, 11 Drawing Sheets

(56) References Cited

U.S. PATENT DOCUMENTS

| | | | | |
|---|---|---|---|---|
| 3,825,231 | A * | 7/1974 | McFarland | B02C 18/301 |
| | | | | 366/196 |
| 3,971,514 | A * | 7/1976 | Martinelli | B02C 18/302 |
| | | | | 241/82.5 |
| 5,251,829 | A | 10/1993 | Lesar | |
| 5,344,086 | A * | 9/1994 | Lesar | B02C 18/365 |
| | | | | 241/82.6 |
| 5,906,154 | A | 5/1999 | Yoon et al. | |
| 6,247,662 | B1 | 6/2001 | Hamilton | |
| 8,584,978 | B2 | 11/2013 | Lesar et al. | |
| 8,794,553 | B2 * | 8/2014 | York | B02C 18/301 |
| | | | | 241/24.26 |
| 9,539,580 | B2 | 1/2017 | Metcalf et al. | |
| 9,750,264 | B2 | 9/2017 | Metcalf et al. | |
| 10,070,656 | B2 | 9/2018 | Metcalf et al. | |
| 10,111,444 | B2 | 10/2018 | Metcalf et al. | |
| 10,618,055 | B2 | 4/2020 | Lesar et al. | |
| 11,014,091 | B2 * | 5/2021 | Voesten | B02C 25/00 |
| 2007/0090220 | A1 * | 4/2007 | Lesar | B02C 18/305 |
| | | | | 241/82.5 |
| 2011/0248109 | A1 | 10/2011 | Lesar et al. | |
| 2014/0252143 | A1 * | 9/2014 | Wight | B02C 18/365 |
| | | | | 241/95 |
| 2015/0196039 | A1 * | 7/2015 | Wolff | A22C 17/0026 |
| | | | | 425/281 |
| 2016/0051990 | A1 * | 2/2016 | Joechner | B02C 18/302 |
| | | | | 241/86.1 |
| 2016/0228880 | A1 * | 8/2016 | Norberg | B02C 18/305 |

FOREIGN PATENT DOCUMENTS

| | | | | |
|---|---|---|---|---|
| KR | 20190000661 U | | 3/2019 | |
| WO | WO-2006104423 A2 * | 10/2006 | | A22C 17/0026 |

* cited by examiner

SEPARATOR AND FEED SCREW FOR A GRINDING MACHINE

FIELD OF THE DISCLOSURE

This present disclosure relates to a separator and feed screw for a grinding machine for foodstuffs such as meat, and more particularly to a recovery system for an orifice plate-type grinding machine that includes a hard material collection arrangement.

BACKGROUND

A typical grinding machine includes a hopper that receives material to be ground and an advancement mechanism such as a rotatable auger that conveys the material away from the hopper toward a grinding head. The grinding head typically includes a discharge opening or outlet within which an orifice plate is positioned. A knife assembly is located between the end of the auger and the orifice plate and is typically engaged with the auger and rotatable in response to rotation of the auger. The knives of the knife assembly cooperate to shear the material as it is forced through the orifices of the orifice plate.

Systems have been developed for the purpose of preventing hard material from passing through the orifices of the orifice plate. In a meat grinding application, for example, such systems function to route hard material such as bone, gristle and sinew away from the grinding orifices of the orifice plate. Typically, hard material collection systems of this type route the hard material to collection passages located toward the center of the orifice plate, where the hard material is supplied to a discharge tube or the like.

The hard material that is discharged through the collection passages is typically contained within a mixture that includes both hard material and soft, usable material. Various arrangements have been developed to recover the soft, usable material within the mixture, some of which are shown and described in the above-noted patents.

The orifice plate is frequently sharpened to maintain grinding efficiency. However, sharpening the orifice plate reduces its thickness, which in turn, reduces tension in the assembly. An operator may use their judgment to reposition the orifice plate to account for the reduced thickness and maintain tension. However, this leads variations in tension, and thus, variations in performance of the grinding machine.

It is an object of the present disclosure to provide an improved system for recovering the soft, usable material in the mixture of hard and soft material that is discharged from hard material collection passages in an orifice plate-type grinding machine. It is another object of the disclosure to provide such a system that provides positive indication of orifice plate positioning during assembly to maintain tension. It is a further object of the disclosure to provide such a system that is capable of continued operation in the event a feed path of an auger or feed screw becomes blocked.

SUMMARY

In an embodiment, a grinding machine includes a first feed screw configured to rotate within a first head to advance material in a downstream direction; a first center pin rotatable with the first feed screw and a first knife assembly rotatable with the first center pin; a bushing configured to receive the first center pin and rotationally support the first center pin; a first orifice plate arranged on the bushing and configured discharge a first portion of the material through an outer section and a second portion of the material through an inner section; a second head coupled to the first orifice plate; a second feed screw coupled to the first center pin and configured to rotate within the second head, the second feed screw configured to receive the second portion of material through an ingress end, wherein an axial face of the ingress end is configured to abut an axial face of the bushing such that the bushing acts as a thrust bearing; a second center pin coupled to and configured to rotate with the second feed screw and a second knife assembly coupled to and configured to rotate with the second center pin; a second orifice plate configured to be axially repositioned along the second center pin, the second orifice plate configured to discharge a third portion of material through a second outer section and a fourth portion of material through a second inner section; and a second mounting ring coupled to the second head by mating engagement allowing linear adjustment of the second mounting ring relative to the second head. The second head includes a stop shoulder and the second mounting ring includes a lip. Linear adjustment of the second mounting ring is configured to axially position the second orifice plate to abut the stop shoulder and the lip.

In an embodiment, a feed screw of a separator assembly is positioned downstream from a grinding arrangement in a grinding machine. The feed screw includes an ingress end configured to receive material; an egress end configured to discharge the material; and a plurality of flights arranged in a split flight configuration. The plurality of flights includes one or more ingress end flights having a first end at the ingress end and a second end at an intermediate location spaced from and between the ingress end and the egress end; and a plurality of egress end flights extending from respective first ends at the egress end to respective second ends at an intermediate location spaced from and between the egress end and the ingress end, each egress end flight extending less than 360 degrees around the second feed screw and terminating in a blade which extends radially outward from each egress end flight.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
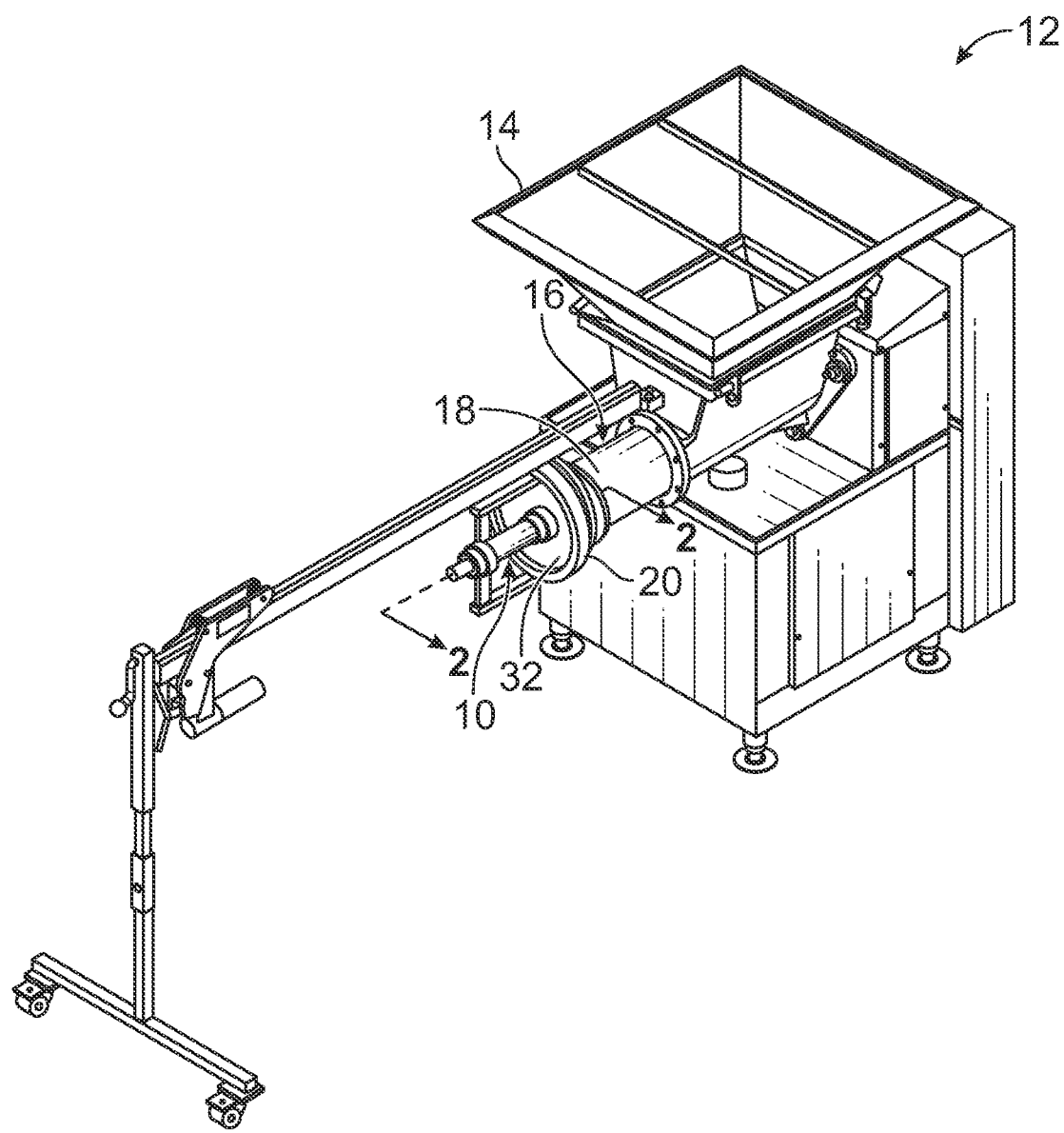
FIG. 1 is an isometric view of a grinding machine incorporating the separator-type recovery system of the present disclosure.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

With reference to FIG. 1, the present disclosure is directed to a separator assembly 10 that can be coupled to a discharge or outlet end of a grinding machine 12. As generally known in the art, grinding machine 12 has a hopper 14 and a grinding arrangement 16. The grinding arrangement 16 includes a first housing or head 18 which includes a first mounting ring 20 that secures a first orifice plate 32 within an opening or discharge outlet in the downstream end of the first head 18.

Figure 2:
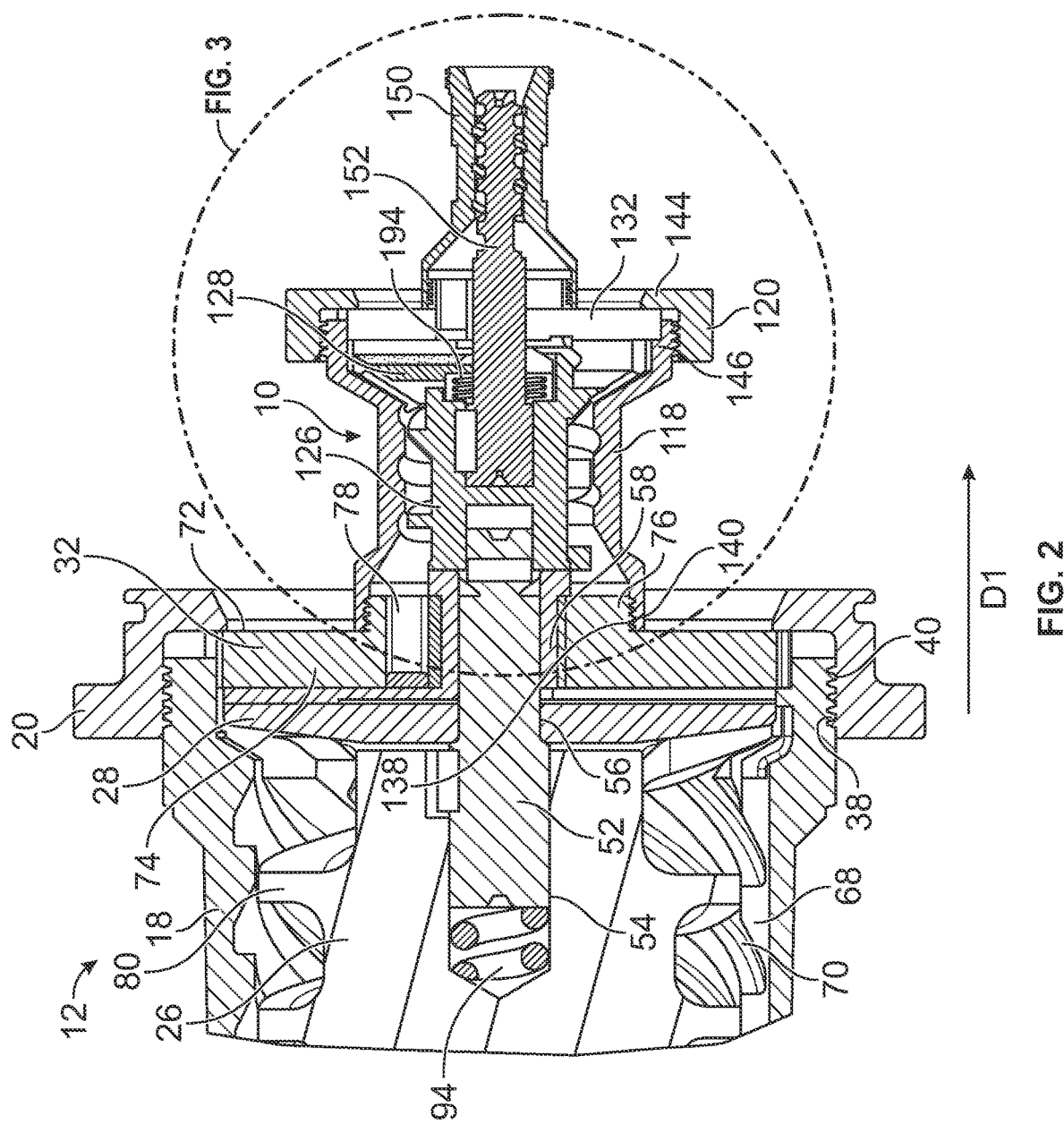
FIG. 2 is a section view taken along line 5-5 in FIG. 1.
Figure 3:
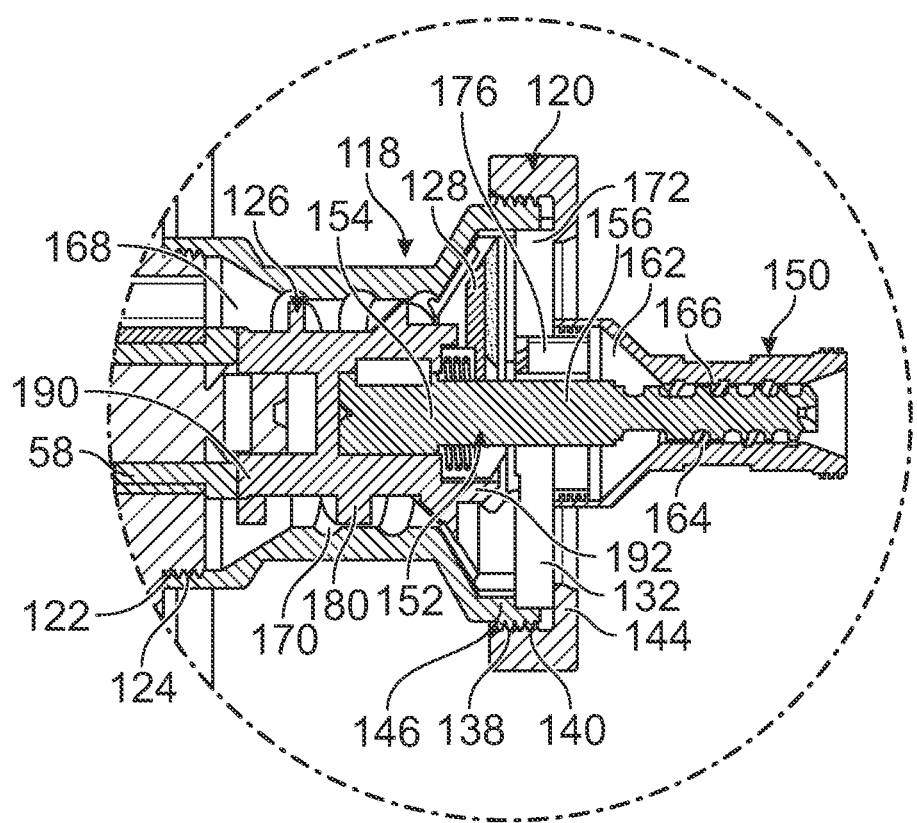
FIG. 3 is an enlarged view of a portion of the grinding machine taken at section A of FIG. 2.
Figure 4:
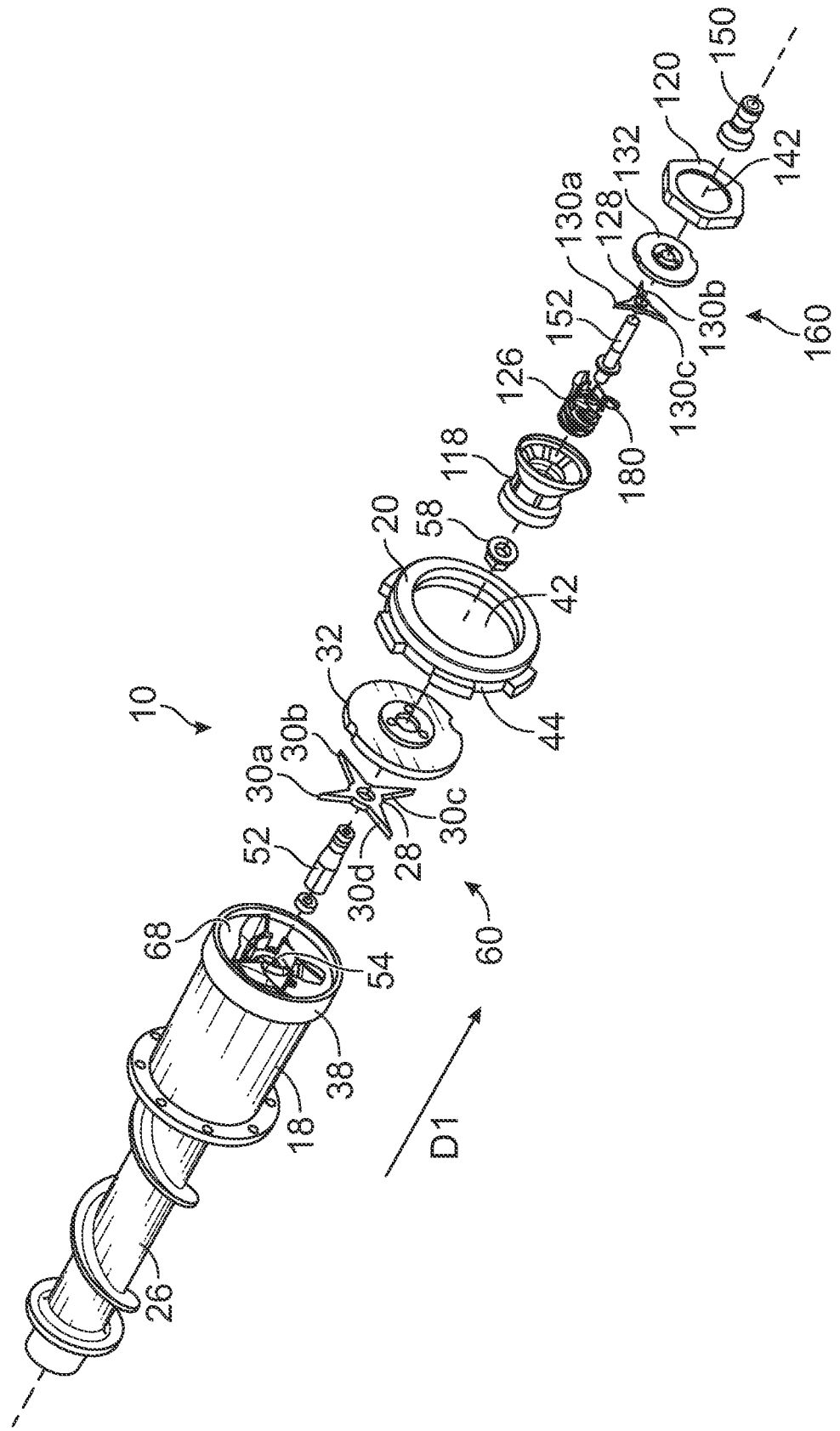
FIG. 4 is an exploded view of the grinding machine arrangement and separator assembly of the grinding machine in FIG. 1.
Figure 5:
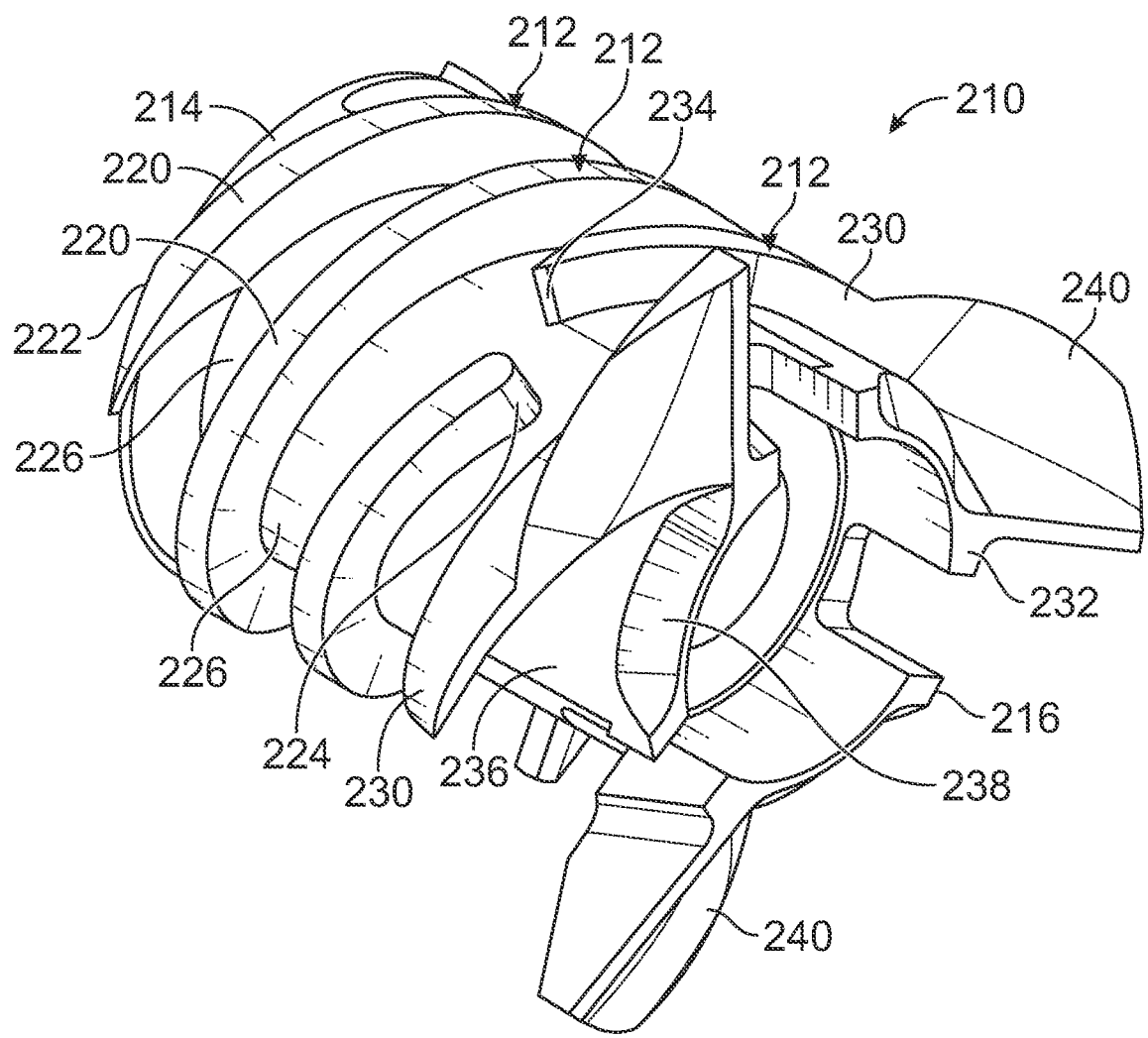
FIG. 5 is a first perspective view of a second feed screw for use in a separator assembly of the grinding machine of FIG. 1.
Figure 6:
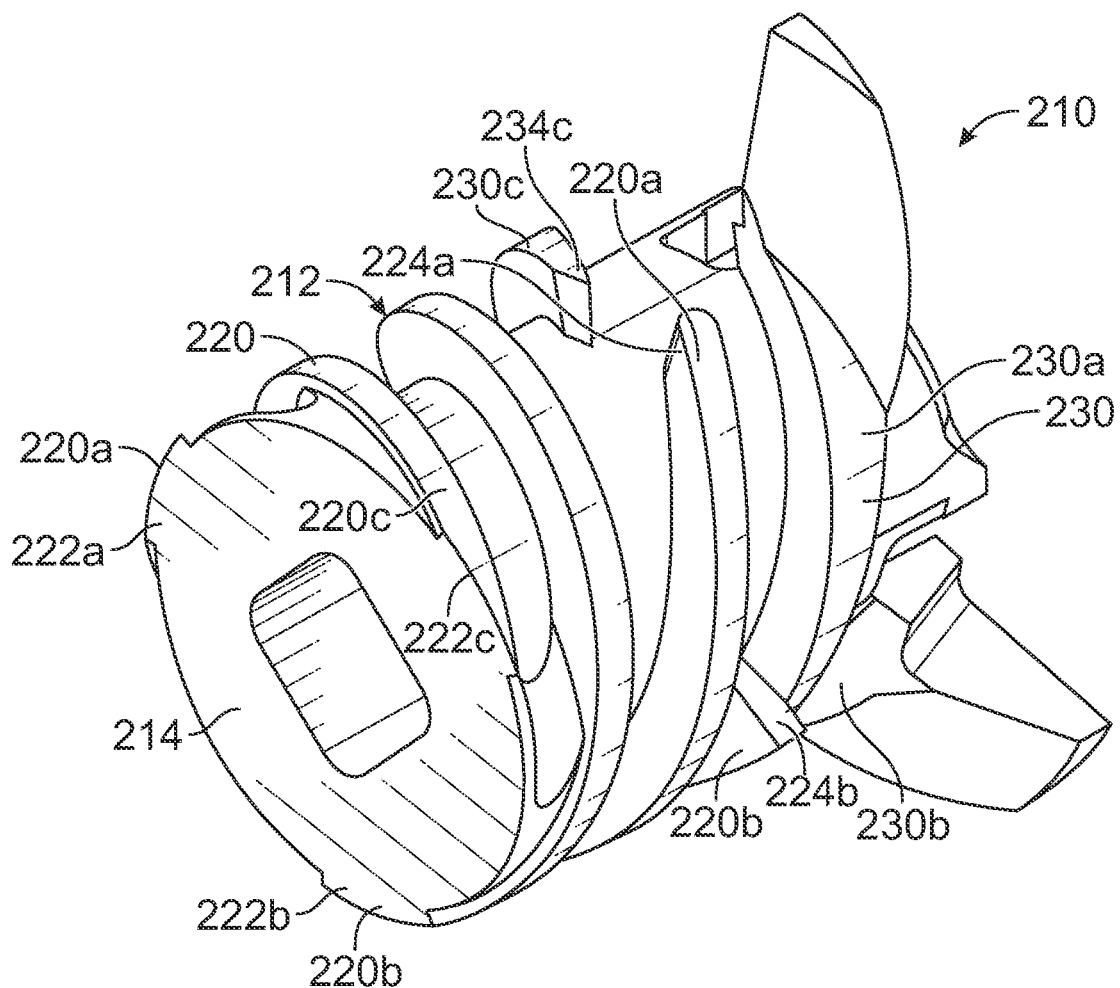
FIG. 6 is a second perspective view of the second feed screw of FIG. 5.

With reference to FIGS. 2-4, the grinding machine 12 further includes a rotatable first feed screw 26 that is rotatably mounted within first head 18 so that, upon rotation of first feed screw 26 within first head 18, material is advanced from hopper 14 through the interior of first head 18. A first knife holder 28 is mounted at the end of, and rotates with, the first feed screw 26. First knife holder 28 has a number of arms 30a-d and a corresponding number of knife inserts, one corresponding to each of arms 30a-d, and it is understood that any number of arms and corresponding inserts may be employed.

The first knife holder 28 is located adjacent an inner grinding surface (i.e., an upstream surface) of first orifice plate 32, which is secured in the open end of first head 18 by a first mounting ring 20. The knife inserts bear against the inner grinding surface of the first orifice plate 32. In accordance with known construction, the end of the first head 18 is provided with a series of external threads 38, and the mounting ring 20 includes a series of internal threads 40 adapted to engage the external threads 38 of head 18. The first mounting ring 20 further includes an opening 42 defining an inner lip 44. While a threaded connection between the first mounting ring 20 and the first head 18 is shown, it is understood that the first mounting ring 20 and the first head 18 may be secured together in any other satisfactory manner.

A first center pin 52 has its inner end located within a central bore 54 formed in the end of the first feed screw 26, and the outer end of the first center pin 52 extends through a central passage 56 formed in a central hub area of the first knife holder 28 and through the center of a bushing 58. The bushing 58 rotationally supports the first center pin 52, and thereby the outer end of the first feed screw 26. A first biasing member 94 is arranged in central bore 54 between first center pin 52 and first feed screw 26. The first center pin 52 is non-rotatably secured to the first feed screw 26, such as by recessed keyways (not shown) on the first center pin 52 that correspond to keys (not shown) on the hub of the first knife holder 28, although it is understood that other engagement structure may be employed for ensuring that the first center pin 52 rotates with the first feed screw 26. Accordingly, rotation of the first feed screw 26 functions to rotate both the first center pin 52 and the first knife assembly 60 (i.e., the first knife holder 28 and the first knife inserts supported by the arms 30a-d). The bushing 58 and the first orifice plate 32 remain stationary and rotatably support the end of the first center pin 52.

As understood in the art, the first head 18 is generally tubular and thus includes a first axial bore 68 in which the first feed screw 26 is rotatably mounted. The bore 68 is typically provided with first flutes 70 for controlling the flow of material through the first head 18, i.e., for preventing material from simply rotating with the first feed screw 26 and for providing a downstream flow path to prevent back-pressure from pushing material back into the hopper 14. Also as is known, the dimension of the flutes 70 may vary along the flute length to produce different effects. The first head 18 may have an increased diameter at its downstream end. The flutes 70 may be primarily located adjacent or along this increased diameter area. The flutes 70 may be dimensioned to move material more efficiently across the transition area between the main body of the first head 18 and the increased diameter area of the first head 18.

Referring to FIG. 2, the first orifice plate 32 has an outer section 72 that includes a large number of relatively small first grinding openings 74, and an inner section 76 that includes a series of first collection passages 78, which may be spaced apart in a circumferential direction. The size of the first grinding openings 74 varies according to the type of material being ground and the desired end characteristics of the ground material. In accordance with known grinding principles, material within the first head 18 is forced toward the first orifice plate 32 by rotation of the first feed screw 26 and through the first grinding openings 74, with the knife inserts of the first rotating knife assembly 60 acting to sever the material against the inner grinding surface of the first orifice plate 32 prior to the material passing through the first grinding openings 74. That is, a first portion of the material passes through the first grinding openings 74.

In some instances, pieces of hard material, such as bone or gristle, which may be too large to pass through the first grinding openings 74, will be present along with the soft, useable material. These pieces of hard material, which are not cut by the action of the knife inserts against the first orifice plate 32, are pushed toward the inner section 76 of the first orifice plate 32 by the rotating action of the first knife assembly 60, where the pieces of hard material can be removed from the primary ground material stream through the first collection passages 78. The first collection passages 78 are large relative to the first grinding openings 74, and may be generally triangular, though it is understood that the first collection passages 78 may have any configuration as desired. Each of the first collection passages 78 may be provided with a ramped entryway opening (not shown) onto the surface of the first orifice plate 32. Ramped entryways may be provided on both sides of the first orifice plate 32, which may be double sided so as to extend the lifetime of use of the first orifice plate 32.

Inevitably, the hard material that passes through the first collection passages 78 carries with it a certain amount of usable soft material. This mixture of soft and hard material, i.e., a second portion of the material, passes through the first collection passages 78 of the first orifice plate 32 to the separator assembly 10, where it can be subjected to a secondary grinding and/or separation process to maximize ground material output. While it is advantageous to have separated as much usable soft material as possible from the hard material before it passes through the first orifice plate 32, nevertheless, in most instances, good, usable soft material is carried with the hard material through the first collection passages 78.

As shown in FIGS. 2-4, the separator assembly 10 includes a second housing or head 118 coupled to the first orifice plate 32. In one example, the first orifice plate 32 has external threads 122 and the second head 118 has internal threads 124 configured for mating threaded engagement with the external threads 122 of the first orifice plate 32 to couple the second head 118 to the first orifice plate 32. The external threads 122 may be provided at inner section 76, for example, on an outer surface of an axial hub.

The second head 118 is generally tubular and thus includes a second axial bore 168 in which a second feed screw 126 is rotatably mounted. The second axial bore 168 is typically provided with second flutes 170 for controlling the flow of material through the second head 118, i.e., for preventing material from simply rotating with the second feed screw 126 and for providing a downstream flow path to limit or prevent backpressure from pushing material back upstream toward the hopper 14. The dimension of the second flutes 170 may vary along the flute length to produce different effects.

In an embodiment, the second feed screw 126 includes a plurality of helical flights 180 formed on an exterior surface. In this manner, with rotation of the second feed screw 126, the flights 180 assist movement of material through the second head 118 in the downstream direction D1.

The second feed screw 126 has an ingress end 190 at a first, upstream axial end and an egress end 192 at a second, downstream axial end, opposite to the ingress end 190. The ingress end 190 is located to the first orifice plate 32 by the bushing 58. For example, the second feed screw 126 may be urged toward the bushing 58 such that an axial face of the ingress end 190 abuts the bushing 58. In one example, the second feed screw 126 is urged toward the bushing 58 by a second biasing member 194, such as a spring.

A second center pin 152 is coupled to the second feed screw 126 and configured to rotate together with the second feed screw 126. In one example, a first portion 154 of the second center pin 152 is received in the second feed screw 126 through the egress end 192 and a second portion 156 of the second center pin 152 extends axially outward from the egress end 192 in the downstream direction D1.

A second knife holder 128 is arranged on the second center pin 152 and includes second arms 130a-c. The second knife holder 128 is configured to rotate with the second center pin 152, for example, by way of a mating keyed interface with the second center pin 152. Other suitable interfaces to accommodate non-rotational coupling between the second knife holder 128 and the second center pin 152 (i.e., to substantially prevent relative rotation between the second knife holder 128 and the second center pin 152). The second biasing member 194 is arranged on second center pin 152 between the second feed screw 126 and the second knife holder 128. In this manner, the second biasing member 194 is seated against the second knife holder 128 and abuts the second feed screw 126 to urge the second feed screw 126 toward the bushing 58.

A second orifice plate 132 is arranged on the second center pin 152 and is rotationally stationary. In one example, the second orifice plate 132 is coupled to the second head 118 and held against rotation by way of the coupling to the second head 118. The second orifice plate 132 includes an outer section 172 having a large number of relatively small second grinding openings (not shown) and an inner section 176 having a series of second collection passages (not shown) which may be spaced apart in a circumferential direction. The inner section 176 is radially within the outer section 172. The size of the second grinding openings varies according to the type of material being ground and desired end characteristics of the ground material. Material within the second head 118 is forced toward the second orifice plate 132 by rotation of the second feed screw 126 and through the second grinding openings, with the second knife inserts of the second rotating knife assembly 160 acting to further sever material against a grinding surface of the second orifice plate 132 prior to material passing through the second grinding openings. In this manner, soft material, i.e., a third portion of the material, may be removed from pieces of hard material received in the separator assembly 10 from the grinding arrangement 16, and the soft material may be collected after passing through the second grinding openings 174 for discharge from the separator assembly 10.

Remaining pieces of hard material which are not cut by action of the second knife inserts against the second orifice plate 132, i.e., a fourth portion of the material, may be pushed toward the inner section 176 of the second orifice plate 132 by rotating action of the second knife assembly 160. The pieces of hard material may then pass through the second collection passages 178 for removal from the material stream.

A second mounting ring 120 is coupled to the second head 118, for example, by way of a mating engagement which allows for linear adjustment of the second mounting ring 120 relative to the second head 118. In the illustrated example, the second mounting ring 120 is coupled to the second head 118 by a mating threaded engagement. For example, the second mounting ring 120 may include internal threads 140 and the second head 118 may include external threads 138 configured for mating engagement with the internal threads 140. Accordingly, the linear position of the second mounting ring 120 relative to the second head 118 may be adjusted by interaction of the mating threads 138, 140 with rotation of the second mounting ring 120.

The second mounting ring 120 also includes an opening 142 bounded, at least partially, by a radially inward extending lip 144. A radius of the opening 142 is smaller than a radius of the second orifice plate 132 such that the lip 144 is configured to retain the second orifice plate 132 axially between portions of the second head 118 and the mounting ring 120. In addition, an axially inner face of lip 144, which radially overlaps a portion of the second orifice plate 132, is configured to abut the second orifice plate 132. Thus, linear movement of the second mounting ring 120 in an axial upstream direction, opposite to the downstream direction D1, i.e., toward the second head 118, may facilitate corresponding linear movement of the second orifice plate 132, for example, during assembly of the separator assembly 10.

The second head 118 further includes an internal stop shoulder 146 having an axial face oriented toward the lip 144 of the mounting ring 120. The stop shoulder 146 overlaps with the second orifice plate 132 in the radial direction. The second mounting ring 120 may be tightened (i.e., linearly repositioned toward the second head 118) to move the lip 144 toward the stop shoulder 146. Rotation of the second mounting ring 120 to tighten against the second orifice plate 132 becomes restricted when the lip 144 and the stop shoulder 146 each abut the second orifice plate 132. That is, linear run or repositioning of the second mounting ring 120 is substantially prevented once the second orifice plate 132 is axially secured and fixed relative to the second head 118 and the second mounting ring 120. In this manner, a proper linear position of the second orifice plate 132 and spring tension within the separator assembly 10 can be positively indicated to the operator.

With further reference to FIGS. 2-4, a cone 150 is coupled to the second orifice plate 132 for example, by a mating threaded engagement. The cone 150 includes an axial bore 162 into which a portion of the second center pin 152 extends. In the illustrated example, the cone 150 may include one or more internal flutes 164 and a portion of the second center pin 152 may include one or more flights 166. Material passed through the second collection passages 178 of the second orifice plate 132, i.e., the fourth portion of the material, may be received in a radial space between the second center pin 152 and the cone 150.

In embodiments of the present grinding machine 12, the first center pin 52, the first feed screw 26, the first knife holder 28, the second feed screw 126, the second knife holder 128 and the second center pin 152 are rotatable together, while the first head 18, the first mounting plate 20, the first orifice plate 32, the bushing 58, the second head 118, the second mounting ring 120, the second orifice plate 132 and the cone 150 are rotationally stationary. Accordingly, the present grinding machine 12 is operable to feed material from the hopper 14 in the downstream direction D1.

In conventional inline grinding machines having a grinding arrangement and a separator downstream from the grinding arrangement, a drive pin is coupled to a feed screw in the grinding arrangement and is rotatable to drive rotation of the feed screw. The drive pin passes through a first bushing and first grinding plate and connects to and holds a separator feed screw in linear position. The separator is coupled to the grinding arrangement in this manner. A separator pin, separator spring, separator knife holder and separator grinding plate are also held in linear position. A separator tube, or head, is mounted to first grinding plate and is fixed in position relative to first grinding plate. The first grinding plate of the conventional inline grinding machine is sharpened on a regular basis, sometimes daily. A thickness of the first grinding plate (i.e., the grinding plate dimension in an axial direction of the grinding machine, such as downstream direction D1) is reduced when the first grinding plate is sharpened. As a result, a position of separator tube moves inward relative to separator feed screw (i.e., in an axial direction opposite to downstream direction D1) and separator grinding plate, both of which remain axially fixed. Such relative movement decreases tension in the separator, which in turn, decreases grinding efficiency of the separator. Thus, each time first grinding plate is sharpened, an operator may attempt to increase tension and improve grinding efficiency by, for example, repositioning the separator grinding plate to account for the movement of the separator tube. In such a process, it is up to the operator to determine the proper tension of the separator, which may lead to inconsistencies of tension of the separator. Inconsistencies with tension can result in inconsistent performance of the separator.

In contrast, the grinding machine 12 of the present embodiments is configured to separate linear positioning of the second feed screw 126 from the first center pin 52. As will be described, the grinding machine 12 of the present embodiments is configured to couple linear positioning of the second feed screw 126 to the first orifice plate 32. Thus, the second feed screw 126 may be consistently positioned relative to the first orifice plate 32. In present embodiments, the bushing 58 functions as a bearing for the first center pin 52 and a thrust surface for the second feed screw 126. That is, the ingress end 190 of the second feed screw 126 abuts against an axial end face of the bushing 58, which functions as a thrust surface. The second feed screw 126 may be urged against the bushing 58 by the second biasing member 194. In this manner, the second feed screw 126 is maintained in a fixed linear position relative to the bushing 58 and the first orifice plate 132.

With further reference to FIGS. 2 and 3, the second head 118 is mounted to the first orifice plate 32, for example, by mating threaded engagement, and is fixed in linear position relative to the first orifice plate 32. Accordingly, the second feed screw 126 and the second head 118 are fixed in linear position relative to one another. As the first orifice plate 32 is sharpened, and is reduced in thickness, the second feed screw 126 and the second head 118 remain in a same position relative to one another. The second head 118 also includes the shoulder stop shoulder 146 which functions as an axial stop for the second orifice plate 132. Thus, the second orifice plate 132 may be repositioned against the stop shoulder 146 for proper positioning when assembling the separator assembly 10 by tightening the second mounting ring 120. In this manner, the second orifice plate 132 may be positioned between and abut the stop shoulder 146 and the lip 144.

The stop shoulder 146 serves as a positive indication of the linear position of the second orifice plate 132. With proper linear positioning, a spring tension of the second biasing member 194 remains constant after each assembly of the grinding machine 12 and separator 10, including after sharpening of the first orifice plate 32. Accordingly, inconsistencies with respect to spring tension found in conventional separators may be avoided by the configuration of the present embodiments. As such, the grinding machine 12 and the separator 10 of the present embodiments may provide consistent tension, and in turn, consistent performance.

The second feed screw 126 of the embodiments described above and with reference to FIGS. 1-4 may be a known feed screw suitable for use in a separator of a grinding assembly. Alternatively, as generally shown in FIGS. 5-16, the separator assembly 10 may include variations of the second feed screw, shown as second feed screw 210 (FIGS. 5-10) and second feed screw 310 (FIGS. 11-16), each of which are described further below. The second feed screw 210, 310 includes flights 212, 312 arranged in a helical pattern on a radially outer facing surface 213, 313. The radially outer facing surface is cylindrical along its length. In the illustrated examples, flights 212, 312 are arranged in a split flight configuration, such that one or more flights of flights 212, 312 includes one or more flights which extend less than an entire axial length of the second feed screw 210, 310. In the split flight configuration, the flights 212, 312 include one or more ingress end flights 220, 320 extending from respective first ends 222, 322 at ingress end 214, 314 of the second feed screw 210, 310 to respective second ends 224, 324 at axially intermediate locations spaced from and between the ingress end 214, 314 and the egress end 216, 316 of the second feed screw 210, 310. Additionally, in the split flight configuration, the flights 212, 312 include a plurality of egress end flights 230, 330 extending from respective first ends 232, 332 at egress end 216, 316 of second feed screw 210, 310 to respective second ends 234, 334 at axially intermediate locations spaced from and between ingress end 214, 314 and egress end 216, 316 of second feed screw 210, 310. The radially outer facing surface 213, 313 forms a space between ingress end flights 220, 320 and egress end flights 230, 330.

Flights 212, 312 are cylindrical such that radially outer surfaces of the flights 212, 312 lie in a cylindrical plane.

A blade 240, 340 is provided at the egress end 216, 316 of each egress end flight 230, 330. The blades 240, 340 extend a radial distance outward beyond the egress end flights 230, 230, i.e., to a height greater than the height of the egress end flights 230, 330, or outward beyond the cylindrical plane. Further, the blades 240, 340 are formed continuously and integrally with the egress end flights 230, 330 and are co-located with the first ends 232, 332 of the egress end flights 230, 330.

One or more ingress feed paths 226, 326 are formed, at least in part, by the one or more ingress end flights 220, 320. An ingress feed path 226, 326 is configured to receive material from the first orifice plate 32 at the ingress end 214, 314 of the second feed screw 210, 310. In the illustrated example, material is received at the ingress end 214, 314 from the inner section 76 of the first orifice plate 32.

A plurality of egress feed paths 236, 336 are formed, at least in part, by the egress end flights 230, 330. An egress feed path 236, 336 is configured to receive material from at least one ingress feed path 226, 326. An outlet end 238, 338 of the egress feed path 236, 336 is arranged adjacent to the egress end 216, 316. In some examples, an egress feed path 236, 336 is configured to receive material, or a portion of material, from at least two different ingress feed paths 226, 326. In addition, an ingress feed path 226, 326 is configured to supply material, or a portion of material, to at least two egress feed paths 230. In this manner, should an egress feed path 236 become blocked with material, material may be fed (e.g., diverted, directed or the like) from the ingress feed path 226 to another egress feed path 236 such that the second feed screw 210, 310 may continue to discharge material and the grinding machine 12 can remain in service.

Referring now to the examples of FIGS. 5-10, the second feed screw 210 includes three ingress end flights 220 (i.e., first ingress end flight 220a, second ingress end flight 220b, and third ingress end flight 220c) and three egress end flights 230 (i.e., first egress end flight 230a, second egress end flight 230b, and third egress end flight 230c). The ingress end flights 220a, 220b, 220c extend from respective first ends 222a, 222b, 222c at the ingress end 214 of the second feed screw 210 to respective second ends 224a, 224b, 224c at an intermediate axial location along the second feed screw 210, spaced from and between the ingress end 214 and the egress end 216.

In the illustrated example, an ingress end flight 220 extends less than 360 degrees around the second feed screw 210, i.e., less than one entire wrap around the second feed screw 210. In some examples, each ingress end flight 220a, 220b, 220c extends less than 360 degrees around the feed screw 210. In one configuration, one or more of ingress end flights 220 extend approximately in the range of 210 degrees to 330 degrees around the second feed screw 210, in a further example, approximately 225 degrees to 300 degrees, and in a still further example, approximately 240 degrees to 270 degrees. However, the ingress end flights 220 are not limited by the illustrated example and may extend to lesser or greater angular extent, to the extent the overall functionality and/or purpose of the second feed screw 210 is maintained. Each ingress end flight 220a, 220b, 220c may extend more than 360 degrees around the feed screw 210.

The ingress feed paths 226 are formed, at least in part, between corresponding pairs of the ingress end flights 220. In the illustrated example of FIGS. 5-10, the second feed screw 210 includes three ingress feed paths 226 (i.e., first ingress feed path 226a, second ingress feed path 226b, and third ingress feed path 226c). First ingress feed path 226a is formed between first ingress end flight 220a and second ingress end flight 220b. Second ingress feed path 226b is formed between second ingress end flight 220b and third ingress end flight 220c. Third ingress feed path 226c is formed between third ingress end flight 220c and first ingress end flight 220a.

Each ingress feed path 226 is configured to receive material at locations adjacent to first ends 222 of corresponding ingress end flights 220, and to discharge material at locations adjacent to second ends 224 of corresponding ingress end flights 220. In one example, each ingress end flight 220, and corresponding ingress feed path 226, may have substantially the same length as the other ingress end flights 220 and corresponding ingress feed paths 226. Second ends 224 of ingress end flights 220 may be arranged at substantially the same axial position of second feed screw 210, spaced apart in a circumferential direction. In addition, in some examples, each ingress end flight 220 may have substantially the same pitch as each of the other ingress end flights 220.

Egress end flights 230 (i.e., first egress end flight 230a, second egress end flight 230b, and third egress end flight 230c) extend from corresponding first ends 232 (i.e., first first end 232a, second first end 232b, and third first end 232c) at egress end 216 to corresponding second ends 234 (i.e., first second end 234a, second second end 234b, and third second end 234c) at axially intermediate positions along the second feed screw 210, i.e., spaced from and between ingress end 214 and egress end 216. Each egress end flight 230 includes the corresponding blade 240 (i.e., first blade 240a, second blade 240b, and third blade 240c).

In one example, each egress end flight 230 extends less than 180 degrees around (i.e., less than ½ wrap) the second feed screw 210. Each egress end flight 230 extends less than 360 degrees (i.e., less than one full wrap) around second feed screw 210. In one example, each egress end flight 230 extends in a range between approximately 60 degrees and 180 degrees around the second feed screw 210, and in a further example, in a range between approximately 90 degrees and 150 degrees. In a still further example, egress end flights 230 extend approximately 120 degrees around second feed screw 210.

Referring still to FIGS. 5-10, in the illustrated examples, three egress feed paths 236 (i.e., first egress feed path 236a, second egress feed path 236b, and third egress feed path 236c) are formed at least partially by various combinations of ingress end flights 220, egress end flights 230 and blades 240. An egress feed path 236 is configured to receive at least a portion of material from at least two ingress feed paths 226. Conversely, each ingress feed path 226 is configured to discharge at least a portion of material to at least two different egress feed paths 236. Egress feed paths 236 are configured to discharge the material through respective outlet ends 238 (i.e., first outlet end 238a, second outlet end 238b, and third outlet end 238c).

Figure 7:
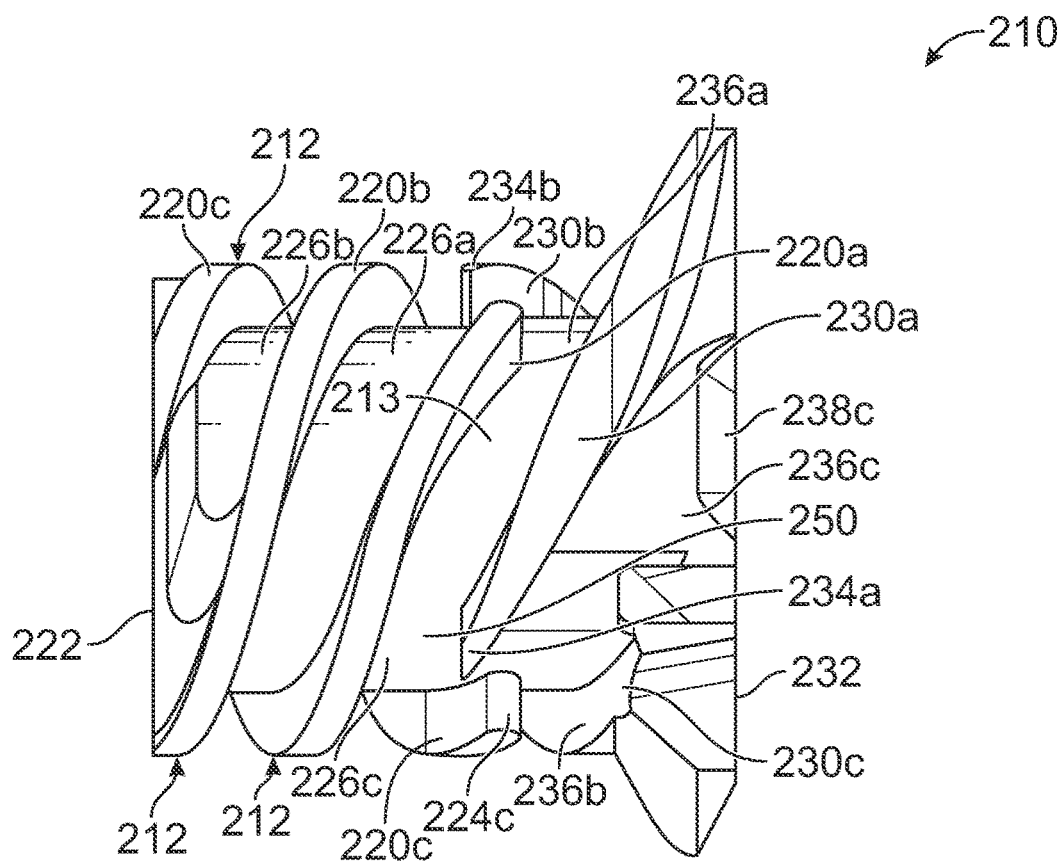
FIG. 7 is a first side view of the second feed screw of FIG. 5 at a first angular position.
Figure 8:
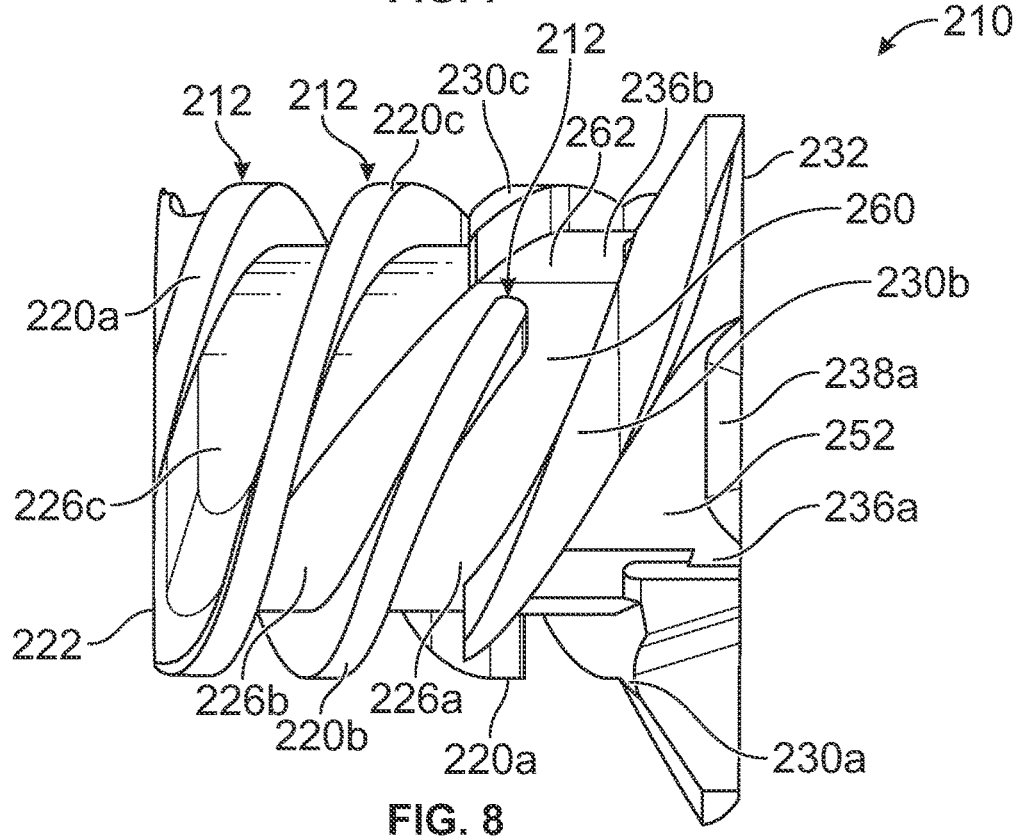
FIG. 8 is a second side view of the second feed screw of FIG. 5 at a second angular position.

For example, with reference to FIGS. 7 and 8, the first egress feed path 236a is configured to receive material from the third ingress feed path 226c and the first ingress feed path 226a. The first egress feed path 236a includes a first portion 250 arranged between the first ingress end flight 220a and the first egress end flight 230a, and a second portion 252 arranged between the second egress end flight 230b and the first egress end flight 230a. The first portion 250 is configured to receive material from the third ingress feed path 226c and the second portion 252 is configured to receive material from the first ingress feed path 226a and the first portion 250.

As shown in FIG. 8, the second egress feed path 236b is configured to receive material from the first ingress feed path 226a and the second ingress feed path 226b. The second egress feed path 236b includes a first portion 260 arranged between the second ingress end flight 220b and the second egress end flight 230b, and a second portion 262 arranged between the third egress end flight 230c and the second egress end flight 230b. The first portion 260 is configured to receive material from the first ingress feed path 226a and the second portion 262 is configured to receive material from the second ingress feed path 226b and the first portion 260.

Figure 9:
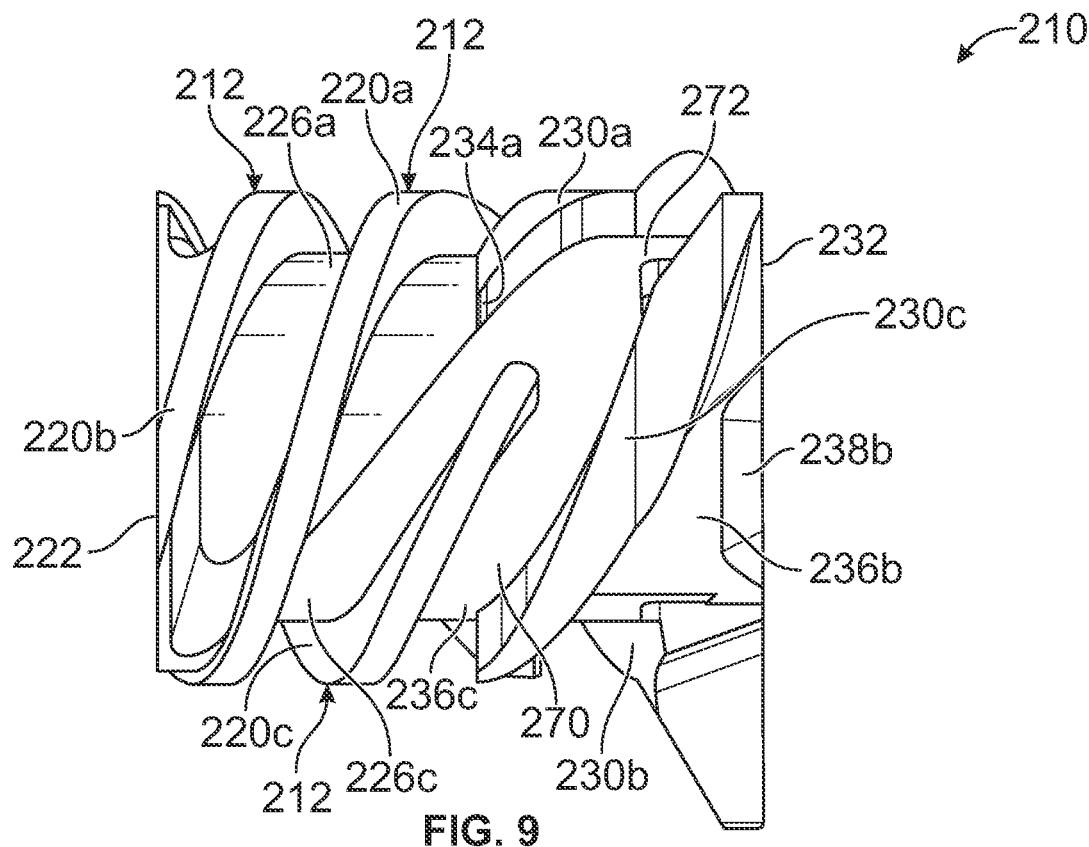
FIG. 9 is a third side view of the second feed screw of FIG. 5 at a third angular position.
Figure 10:
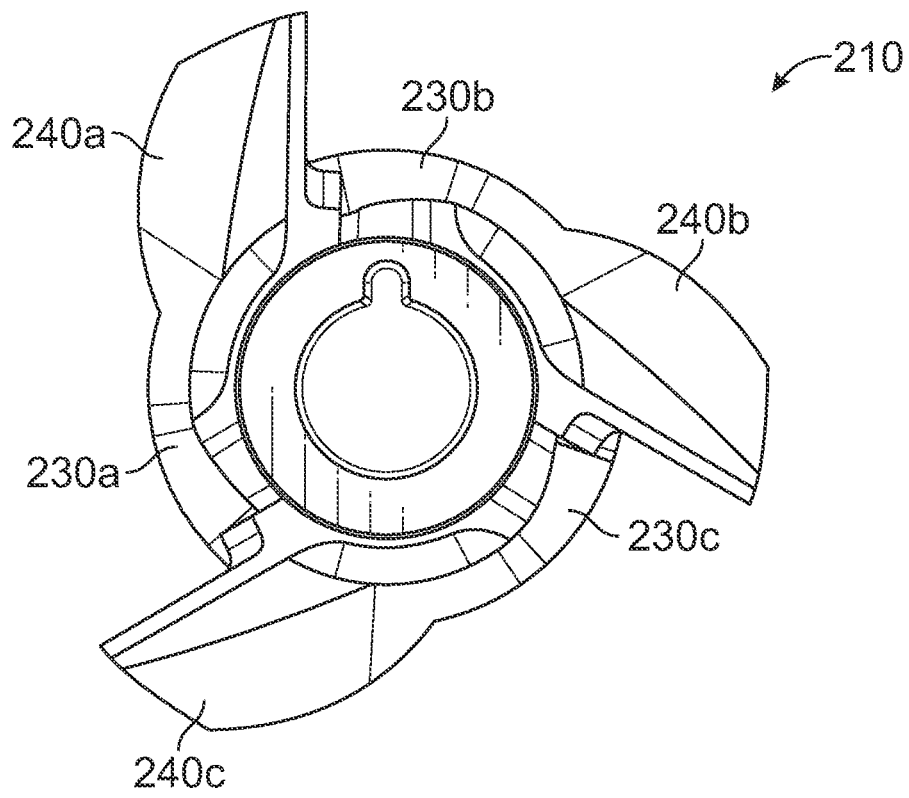
FIG. 10 is an end view of the second feed screw of FIG. 5.
Figure 11:
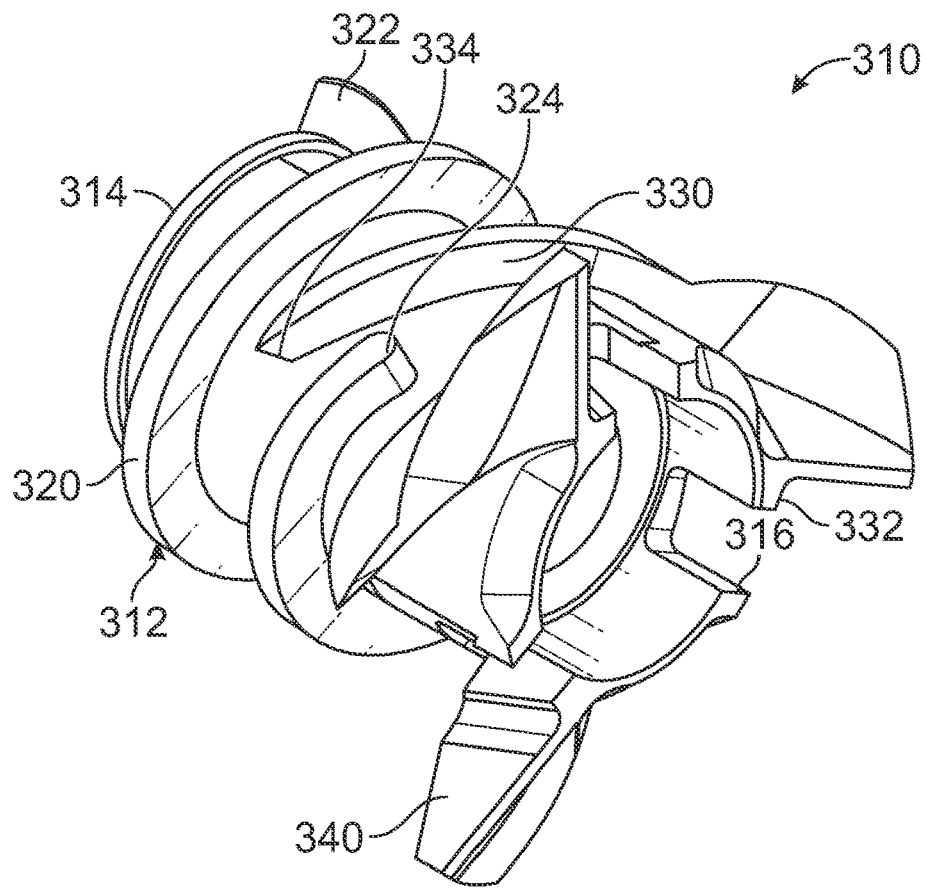
FIG. 11 is a first perspective view of alternate embodiment of second feed screw for use in a separator assembly of the grinding machine of FIG. 1.
Figure 12:
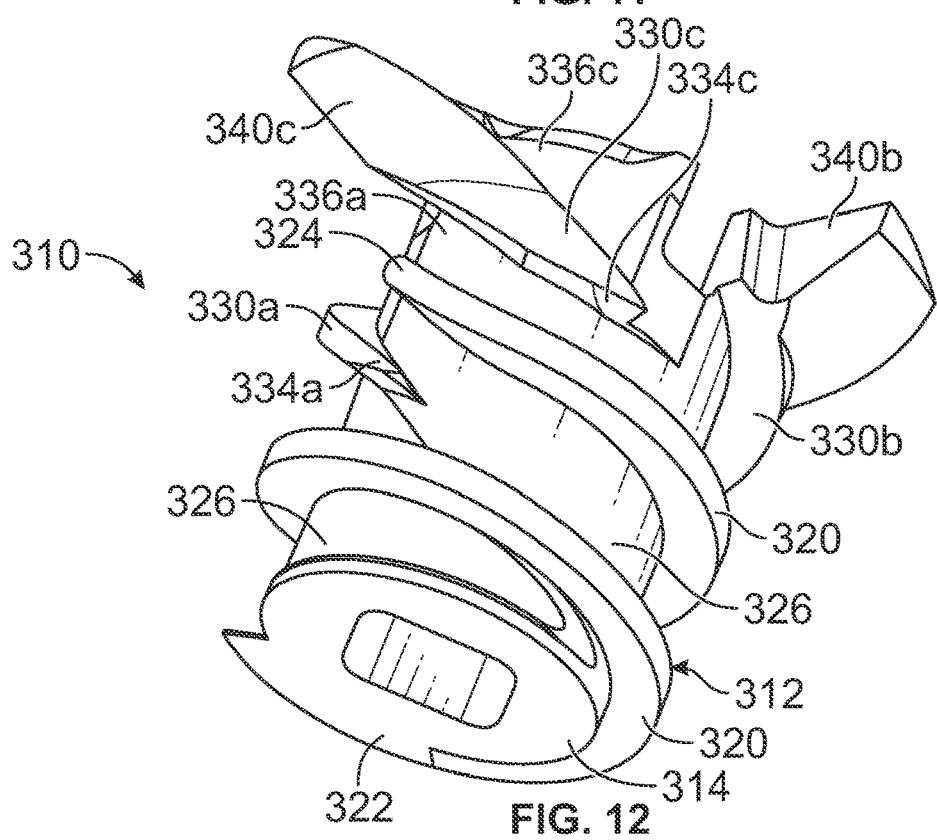
FIG. 12 is a second perspective view of the second feed screw of FIG. 11.

Referring to FIGS. 8 and 9, the third egress feed path 236c is configured to receive material from the second ingress feed path 226b and the third ingress feed path 226c. The third egress feed path 236c includes a first portion 270 arranged between the third ingress end flight 220c and the third egress end flight 230c, and a second portion 272 arranged between the first egress end flight 230a and the third egress end flight 230c. The first portion 270 is configured to receive material from the second ingress feed path 226b and the second portion 272 is configured to receive material from the third ingress feed path 226c and the first portion 270.

Accordingly, in the embodiments above, material may be received in first egress feed path 236a and discharged at first outlet end 238a. Similarly, material may be received in second and third egress feed paths 236b, 236c and discharged at respective second and third outlet ends 238b, 238c. In the event an egress feed path is blocked, for example, by a large piece of solid material, material upstream of the blocked feed path may divert, or be fed, to another egress feed path 236. For example, if a blockage is formed in first egress feed path 236a, material from third ingress feed path 226c may divert to third egress feed path 236c, via second portion 272 of third egress feed path 236c. Alternatively, or in addition, material from first ingress feed path 226a may divert to second egress feed path 236b via first portion 260 of second egress feed path 236b. It will be appreciated that if a blockage is formed in second egress feed path 236b or third egress feed path 236c, material from first and second ingress feed paths 226a, 226b may divert in a similar manner to that above.

With reference to the examples shown in FIGS. 11-16, the second feed screw 310 includes flights 312 arranged in a split flight configuration. In the split flight configuration, flights 312 include one or more ingress end flights 320 and a plurality of egress end flights 330. In the illustrated example, the second feed screw 310 includes a single ingress end flight 320 and three egress end flights 330 (i.e., first egress end flight 330a, second egress end flight 330b, and third egress end flight 330c), although it will be appreciated that the number of flights 320, 330 may be varied. Ingress end flight 320 extends from the first end 322 at the ingress end 314 to the second end 324 at an intermediate axial position spaced from and between the ingress end 314 and the egress end 316 of the second feed screw 310. Egress end flights 330 extend from respective first ends 332 (i.e., first first end 332a, second first end 332b, and third first end 332c) at egress end 316 (FIGS. 14-16) to respective second end 334 (i.e., first second end 334a, second second end 334b, and third second end 334c) at an intermedial axial position spaced from, and between ingress end 314 and egress end 316 of second feed screw 310. Egress end flights 330 are formed with respective blades 340 (i.e., first blade 340a, second blade 340b and third blade 340c).

In the illustrated example, the ingress end flight 320 extends to s suitable angular extent around the second feed screw 310 while maintaining the functionality of the second feed screw 310 described below. For example, in the illustrated embodiments, the ingress end flight 320 may extend approximately 360 degrees to approximately 720 degrees around the second feed screw 310. In further examples, the ingress end flight 320 may extend approximately 540 degrees to approximately 720 degrees around second feed screw 310. However, it will be appreciated that ingress end flight 320 may extend to a lesser angular extent or greater angular extent around second feed screw 310 than provided in the examples above so long as functionality of second feed screw 310 described herein is maintained. A pitch of ingress end flight 326 may vary along the axial direction of second feed screw 310.

Ingress feed path 326 is formed at least in part by ingress end flight 320 and is configured to receive material through first orifice plate 32. A length of ingress end flight 320 may vary as well, which may vary the angular extent of ingress end flight 320.

One or more egress end flight 330 is formed having a different length than one or more other egress end flights 330. In the illustrated example, the first egress end flight 330a has a length greater than respective lengths of the second and third egress end flights 330b, 330c. The second end 334a of the first egress end flight 330a may be arranged between successive wraps of ingress end flight 320, i.e., within ingress feed path 326.

In addition, second egress end flight 330b may have a length shorter than the length of first egress end flight 330a and longer than a length of third egress end flight 330c. Thus, third egress end flight 330c may have a length shorter than the respective lengths of first and second egress end flights 330a, 330b. Second end 334b of second egress end flight 330b is positioned outside of ingress feed path 326 and axially between ingress end flight 320 and egress end 316 of second feed screw 310. The second end 334c of third end egress flight 330c is also positioned outside of ingress feed path 326 and axially between ingress end flight 320 and egress end 316. In the illustrated example, second end 334c is positioned nearer to egress end 316 than second end 334b in the axial direction.

In one example, each egress end flight 330 extends less than 180 degrees around (i.e., less than ½ wrap) the second feed screw 310. Each egress end flight 330 extends less than 360 degrees (i.e., less than one full wrap) around second feed screw 310. In one example, each egress end flight 330 extends in a range between approximately 60 degrees and 180 degrees around the second feed screw 310, and in a further example, in a range between approximately 90 degrees and 150 degrees. In a still further example, egress end flights 330 extend approximately 120 degrees around second feed screw 310.

In the illustrated example, three egress feed paths 336 (i.e., first egress feed path 336a, second egress feed path 336b, and third egress feed path 336c) are formed at least partially by ingress end flight 320, egress end flights 330, and blades 340. Each egress feed path 336 is configured to receive at least a portion of material from ingress feed path 326. That is, ingress feed path 326 and egress feed paths 336 are arranged relative to one another such that material from ingress feed path 326 may flow into and be discharged from outlet ends 338 (i.e., first outlet end 338a, second outlet end 338b, and third outlet end 338c) of any egress feed path 336. Thus, in the case of an egress feed path becoming blocked, material may divert to another egress feed path without interrupting a grinding process to service the grinding machine 12.

Figure 13:
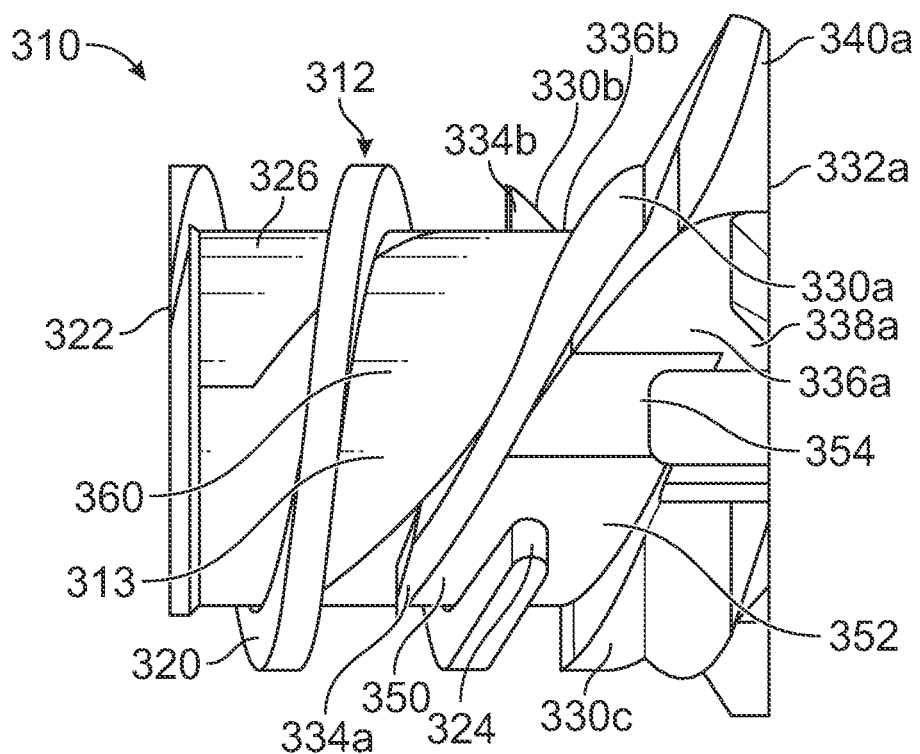
FIG. 13 is a first side view of the second feed screw of FIG. 11 at a first angular position.
Figure 14:
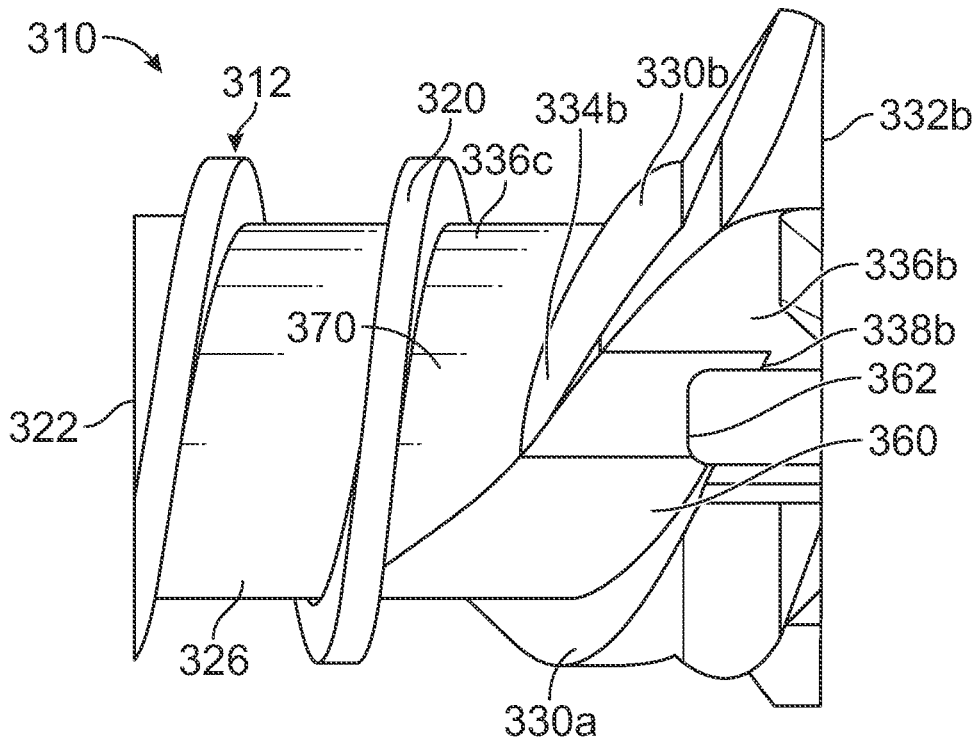
FIG. 14 is a second side view of the second feed screw of FIG. 11 at a second angular position.
Figure 15:
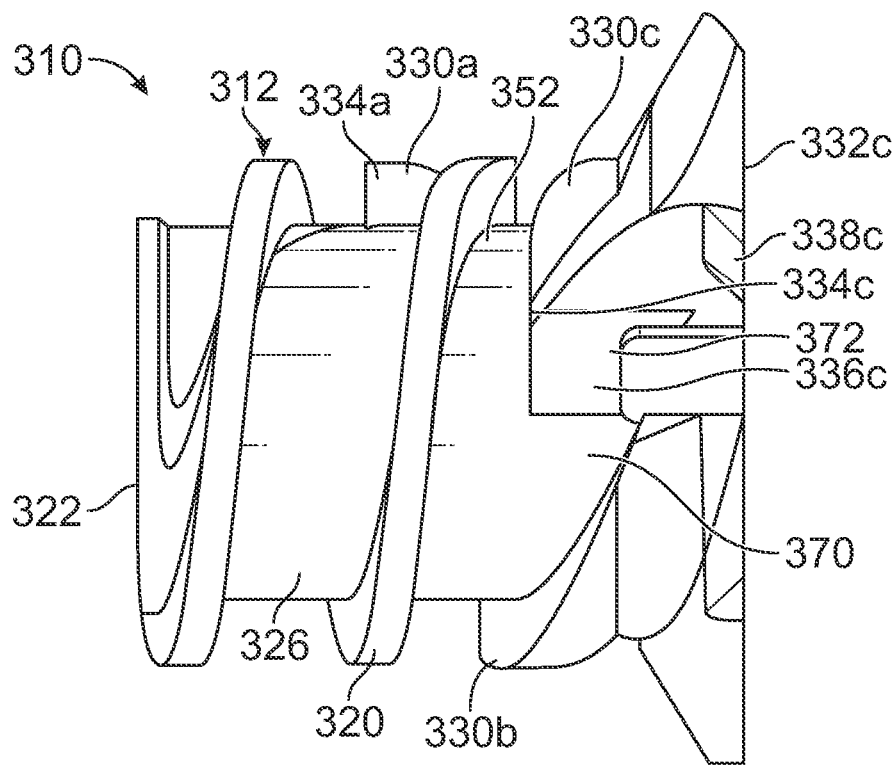
FIG. 15 is a third side view of the second feed screw of FIG. 11 at a third angular position.
Figure 16:
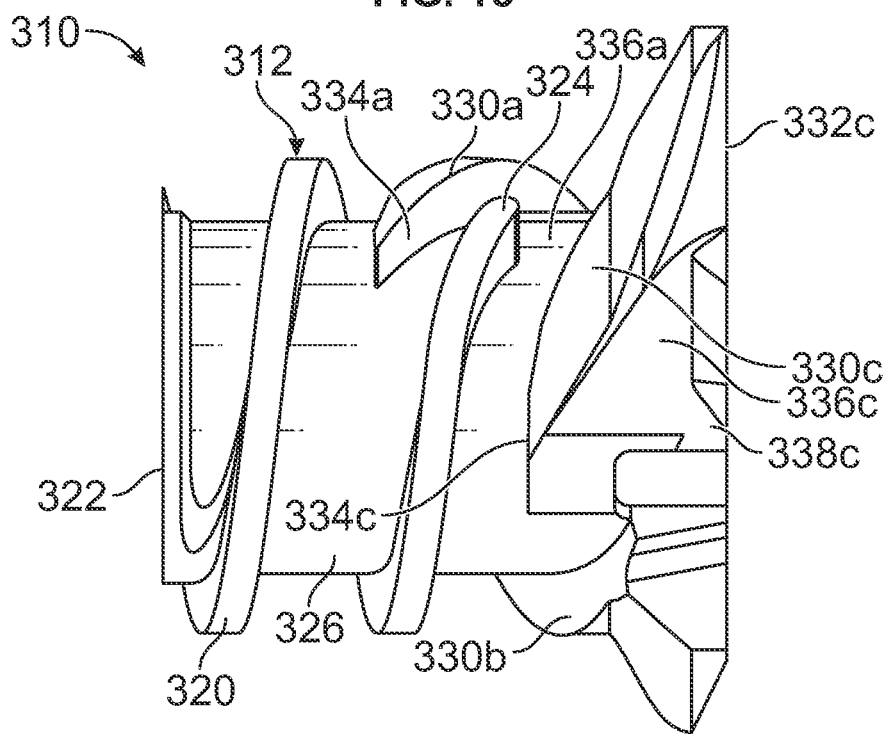
FIG. 16 is a fourth side view of the second feed screw of FIG. 11 at a fourth angular position.

As shown in FIG. 13, first egress feed path 336a includes a first portion 350 arranged between ingress end flight 320 and first egress end flight 330a, a second portion 352 arranged between ingress end flight 320 and third egress end flight 330c, and a third portion 354 arranged between first egress end flight 330a and third egress end flight 330c. With reference to FIG. 14, second egress feed path 336b includes a first portion 360 arranged between ingress end flight 320 and first egress end flight 330a and a second portion 362 arranged between second egress end flight 330b and first egress end flight 330a. As shown in FIGS. 15 and 16, third egress feed path 336c includes a first portion 370 arranged between ingress end flight 320 and second egress end flight 330b and a second portion 372 arranged between third ingress end flight 330c and second egress end flight 330b.

Accordingly, material may be fed from ingress feed path 326 to any of the egress feed paths 336 for discharge from a corresponding outlet end 338. For example, with reference to FIG. 13, material may be fed from ingress feed path 326 for discharge from first outlet end 338a via first portion 350 and third portion 354 of first egress feed path 336a. With reference to FIGS. 13 and 14, material may be fed from ingress feed path 326 for discharge from second outlet end 338b via first portion 360 and second portion 362 of second egress feed path 336b. With reference to FIGS. 14 and 15, material may be fed from ingress feed path 326 for discharge from third outlet end 338c via first portion 360 of second egress feed path 336b, and first and second portions 370, 372 of third egress feed path 336c. In addition, with reference to FIGS. 13-16, material may be fed from ingress feed path 326 for discharge from first outlet end 338a via first portion 360 of second egress feed path 336b, first portion 370 of third egress feed path 336c, second portion 352 of first egress feed path 336a and third portion 354 of first egress feed path 336a.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

The invention claimed is:

1. A grinding machine comprising:
   a first feed screw configured to rotate within a first head to advance material in a downstream direction;
   a first center pin rotatable with the first feed screw and a first knife assembly rotatable with the first center pin;
   a bushing configured to receive the first center pin and rotationally support the first center pin;
   a first orifice plate arranged on the bushing and configured discharge a first portion of the material through an outer section and a second portion of the material through an inner section;
   a second head coupled to the first orifice plate;
   a second feed screw coupled to the first center pin and configured to rotate within the second head, the second feed screw configured to receive the second portion of the material through an ingress end, wherein an axial face of the ingress end is configured to abut an axial face of the bushing such that the bushing acts as a thrust bearing;
   a second center pin coupled to and configured to rotate with the second feed screw and a second knife assembly coupled to and configured to rotate with the second center pin;
   a second orifice plate configured to be axially repositioned along the second center pin, the second orifice plate configured to discharge a third portion of material through a second outer section and a fourth portion of material through a second inner section; and
   a mounting ring coupled to the second head by mating engagement allowing linear adjustment of the mounting ring relative to the second head,
   wherein the second head includes a stop shoulder and the mounting ring includes a lip, and
   wherein linear adjustment of the mounting ring is configured to axially position the second orifice plate to abut the stop shoulder and the lip.

2. The grinding machine of claim 1, further comprising a first biasing member arranged between the first feed screw and the first center pin and a second biasing member positioned on the second center pin and arranged between the second feed screw and the second knife assembly.

3. The grinding machine of claim 1, further comprising a cone coupled to the second orifice plate, wherein the cone is configured to receive a portion of the second center pin.

4. The grinding machine of claim 1, wherein the first feed screw includes one or more first flights and the first head includes one or more first flutes, wherein the first flights and the first flutes are configured to interact with the material to move the material in the downstream direction with rotation of the first feed screw.

5. The grinding machine of claim 1, wherein the second feed screw includes one or more second flights and the second head includes one or more second flutes, wherein the second flights and the second flutes are configured to interact with the second portion of the material to move the second portion of the material in the downstream direction with rotation of the second feed screw.

6. The grinding machine of claim 5, wherein:
the one or more second flights are arranged in a split flight configuration,
the one or more second flights of the split flight configuration include one or more ingress end flights and a plurality of egress end flights, each egress end flight extending less than 360 degrees around the second feed screw and terminating in a blade which extends radially outward from each egress end flight.

7. The grinding machine of claim 6, wherein:
the second feed screw including an ingress end configured to receive material and an egress end configured to discharge the material;
the one or more ingress end flights include three ingress end flights, the ingress end flights extending from respective first ends at the ingress end of the second feed screw to respective second ends at intermediate locations axially spaced from and between the ingress end of the second feed screw and the egress end of the second feed screw; and
the plurality of egress end flights include three egress end flights, the egress end flights extending from respective first ends at the egress end of the second feed screw to respective second ends at intermediate locations axially spaced from and between the egress end of the second feed screw and the ingress end of the second feed screw.

8. The grinding machine of claim 7, wherein three ingress feed paths are formed between respective pairs of adjacent ingress end flights, and three egress feed paths are formed between respective pairs of adjacent egress end flights.

9. The grinding machine of claim 8, wherein each ingress feed path is configured to discharge the material to at least two different egress feed paths.

10. The grinding machine of claim 6, wherein:
the second feed screw including an ingress end configured to receive material and an egress end configured to discharge the material;
the one or more ingress end flights include a single ingress end flight extending from a first end at the ingress end of the second feed screw to a second end at an intermediate location axially spaced from and between the ingress end and the egress end of the second feed screw; and
the plurality of egress end flights include three egress end flights, the egress end flights extending from respective first ends at the egress end of the second feed screw to respective second ends at intermediate locations axially spaced from and between the egress end and the ingress end of the second feed screw.

11. The grinding machine of claim 10, wherein the one or more ingress end flights extends 360 degrees to 720 degrees around the second feed screw.

12. The grinding machine of claim 10, an ingress feed path is formed at least in part by the one or more ingress end flights, and three egress feed paths are formed at least in part between respective pairs of adjacent egress end flights.

13. The grinding machine of claim 12, wherein the ingress feed path is configured to discharge second portions of the material to each egress feed path.

* * * * *